June 7, 1966  H. G. ROGERS  3,255,002
COLOR PHOTOGRAPHIC PROCESS AND PRODUCT
Filed March 9, 1961

INVENTOR.
Howard G. Rogers
BY Brown and Mikulka
and
Alvin Isaacs
ATTORNEYS

United States Patent Office 3,255,002
Patented June 7, 1966

3,255,002
COLOR PHOTOGRAPHIC PROCESS AND PRODUCT
Howard G. Rogers, Weston, Mass., assignor to Polaroid Corporation, Cambridge, Mass., a corporation of Delaware
Filed Mar. 9, 1961, Ser. No. 94,521
7 Claims. (Cl. 96—29)

This invention relates to photography and, more particularly, to novel processes and products for use in the production of color images.

It is accordingly one object of the present invention to provide novel procedures, products and compositions useful for the preparation of color images.

Another object of the present invention is to provide novel procedures, products and compositions useful for obtaining color copies of positive and negative transparencies.

Still another object of the present invention is to provide novel procedures, products and compositions wherein suitable light-sensitive materials are utilized to control the diffusion of dyes or the color-forming components of dyes to an image-receiving layer or stratum.

A further object is to provide light-sensitive polymeric materials which, by means of internal modification upon exposure to actinic energy, become differentially permeable to photographic dye solutions.

A still further object is to provide the procedures, products and compositions for the utilization of light-sensitive polymeric materials for the production of dye images by diffusion-transfer processes.

These and other objects of the invention will in part be obvious and will in part appear hereinafter.

The invention accordingly comprises the several steps and the relation and order of one or more of such steps with respect to each of the others, and the products possessing the features, properties and the relation of elements which are exemplified in the following detailed disclosure and the scope of the application of which will be indicated in the claims.

For a fuller understanding of the nature of this invention, reference should be had to the following detailed description taken in connection with the accompanying drawing wherein.

Figure 1:
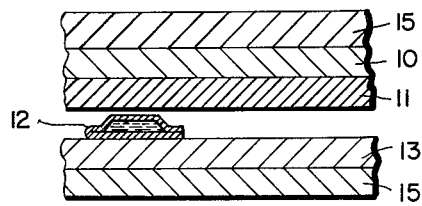
FIGURE 1 is a longitudinal, diagrammatic, fragmentary, sectional view of a novel photographic product useful in the practice of this invention, the thickness of the various layers or strata being greatly exaggerated for purposes of illustration.

It is well known in the art to prepare color copies by so-called pigment printing processes. As illustrative of such processes, a layer of gelatin containing coloring matter, such as, for example, a dye solution, is placed upon a suitable support and then rendered sensitive to light, i.e., sensitized, by the addition thereto of materials such as potassium bichromate or ammonium bichromate.

The gelatin layer may be made light sensitive by incorporating the bichromate therein or by applying the bichromate as a second coating on top of the layer of gelatin. The exposed areas of the gelatin layer are rendered insoluble, whereas the unexposed areas remain soluble and are subsequently washed away by means of water to obtain the color image.

It is also well known to obtain color images by the so-called diazo-type processes employing a diazo compound as the light-sensitive element and an azo dye coupling component as the color-forming body. The azo dye coupling component used for the development of the image may be contained in an alkaline developing solution, as is the case in the so-called wet development or one-component process. In the dry development or two-component process, the sensitizing composition contains both the diazo compound and the azo coupling component. In either variation, the process is predicated upon the fact that the diazo compound is decomposed in exposed areas by actinic light, thereby precluding coupling with the azo component; whereas, in unexposed areas, coupling will occur under suitable conditions, such as by contacting with alkaline vapors, thereby forming the dye image.

I have now discovered that color images can be obtained in a simple one-step operation by diffusion-transfer processes employing a suitable dye and a light-sensitive polymeric material which may be rendered differentially permeable to a dye solution upon exposure to actinic energy.

The expression "permeable" as used herein denotes the permeability to a photographic solution in the absence of exposure. Exposure of the light-sensitive polymeric material results in a reduction in this permeability in the area of exposure as a function of the point-to-point degree of exposure, and the exposed light-sensitive layer may be said to exhibit "differential permeability" or "differential impermeability."

I have found that these light-sensitive materials may be utilized to control the diffusion of image-forming constituents such as dye or dyes, or the color-forming components of a dye or dyes, in diffusion-transfer processes due to the differential impermeability of the light-sensitive materials caused by their selective exposure to actinic radiation. The exposure of the light-sensitive materials to actinic energy effects a differential hardening of the materials caused by their selective exposure to actinic radiation. Thus, the distributive diffusion of a dye or dyes, or the color-forming components thereof, is determined by selective exposure and subsequent differential hardening in the exposed areas, thereby effecting a differential variation in the permeability of the light-sensitive material.

As was indicated above, the present invention is concerned with improvements in procedures and products utilized for the formation of dye images by one-step photographic transfer processing. The invention may best be understood by referring to the drawing which illustrates various ways by which color images may be obtained by diffusion-transfer processes according to the present invention.

In one embodiment of the present invention a multi-layer assembly, as illustrated in FIGURE 1, is employed. A dye or a number of dyes are contained in a layer 10 adjacent to and associated with a layer 11 of a light-sensitive, permeable polymeric material, such as for example, those light-sensitive polymeric materials described with more particularity hereinafter. Upon exposure to actinic light, the exposed area of the polymeric material undergoes a modification quantitatively reducing the liquid-permeability of said area in proportion to the amount of exposure per unit area thereof. A suitable dye solvent is applied, preferably by rupture of a frangible container 12 and dispersion of its contents according to the procedures disclosed in Patent No. 2,634,886, issued April 14, 1953 to Edwin H. Land. The dye solvent, capable of permeating only the unexposed polymeric material as a result of the reduced permeability of exposed areas, acts as a carrier for the transfer of dye from the polymeric layer 10, by imbibition, to a print-receiving layer 13, held in such close proximity to the polymeric layer 11 that a substantially imagewise distribution of dye, in terms of the unexposed areas of the light-sensitive polymeric layer, is transferred to the print-receiving layer 13. In this manner, a positive image, in terms of the subject matter, is formed on the print-receiving element.

Figure 2:
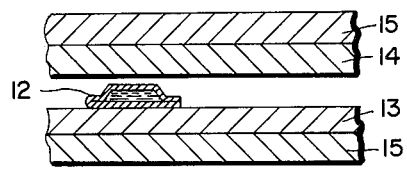
FIG. 2 is a corresponding view of another embodiment of a light-sensitive element useful in the practice of this invention.
Figure 3:
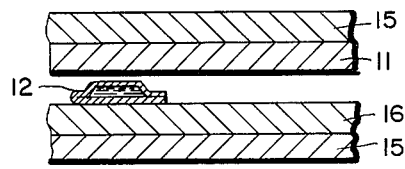
FIG. 3 is a longitudinal, diagrammatic, fragmentary, sectional view of still another embodiment of this invention.

Following the formation on the print-receiving layer 13 of the dye image, the light-sensitive polymeric layer 11 and the print-receiving layer 13 may be separated, as by being stripped apart, to reveal the positive image on the print-receiving layer 13.

Where desired, a suitable support layer 15 may be associated with a light-sensitive layer and/or a print-receiving layer, as illustrated in FIGURES 1–3, to provide increased structural strength and stability.

Another embodiment of the invention comprises a unitary layer system as illustrated in FIGURE 2, in which the dye or dyes are incorporated in a layer 14 of a light-sensitive polymeric material, the permeability of which is capable of modification upon exposure to actinic light so that the diffusion of the dye or dyes contained therein from the polymeric layer 14, upon contacting the polymeric material with a solvent for the dye or dyes, is quantitatively reduced in the exposed area and a substantially imagewise distribution of dye, in terms of the unexposed area of the light-sensitive polymeric layer 14, is transferred, by imbibition, to a print-receiving stratum 13 held in close proximity to the polymeric layer 14.

It should be noted that a photographic negative may be obtained from a differentially permeable polymeric element, such as those illustrated above, by making the imbibition time to effect transfer of the solubilized dye through and/or from the unexposed areas of the selectively exposed polymeric element of sufficient duration so as to substantially exhaust the color, i.e., the dye, content from the unexposed areas.

As illustrated in FIGURE 3, a still further embodiment of the invention comprises incorporating a dye or dyes in a layer 16 carried by a suitable support 15 and which is then held in superposed, close proximity with a selectively exposed light-sensitive polymeric layer 11, absorbing a suitable dye-solvent from frangible container 12 into the dye layer 16 and into the unexposed areas of the polymeric layer 11, thereby transferring a substantially imagewise distribution of the dye from the dye layer 16, by imbibition, to the unexposed areas of the polymeric layer 11. In this manner, there is obtained a positive image in the polymeric layer 11 in terms of the unexposed area of the polymeric layer 11 and there is also obtained a negative image in the negative element 16 in terms of the exposed area of the light-sensitive polymeric layer. It will be appreciated that the desired transfer will be appreciably improved if the unexposed portions of the polymer exhibit a selective affinity or mordant action toward the dye.

Figure 4:
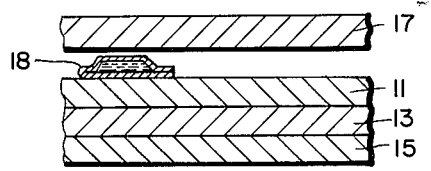
FIG. 4 is a longitudinal, diagrammatic, fragmentary, sectional view of a still further embodiment of this invention.

As illustrated in FIGURE 4, where desirable, the dye or dyes may be incorporated in a dye solvent in frangible container 18 prior to its application to an exposed light-sensitive, differentially permeable polymeric layer coated on an image-receiving sheet 13, so that an imagewise distribution of the dye containing solvent diffuses, by imbibition, through the unexposed region of the polymeric layer to yield on and/or in the print-receiving stratum 13 and in polymeric layer 11 an imagewise distribution of dye in terms of the unexposed area of the light-sensitive polymeric material. Application of the dye solvent may be facilitated, if desired, by the use of an impermeable spreading sheet 17. If desired, a suitable stripping layer may be provided between the polymeric layer 11 and the image-receiving layer 13, thereby facilitating removing the polymeric layer 11 after formation of the dye image in or on the image-receiving layer 13.

In a modification of this procedure, the polymeric layer may be self-supporting or mounted on a thin permeable support. After exposure, and either before or after application of the dye solvent between the polymeric layer and the spreading sheet, the image-receiving layer may be applied to the back of the polymeric layer to receive the dye transferring therethrough.

Where desired, a multiplicity of positive prints may be formed by transferring a plurality of dye images from a selectively exposed light-sensitive differentially permeable polymeric stratum to a plurality of successively superposed image-receiving layers. This is particularly effective in the last-mentioned embodiment (see FIG. 4) wherein the exposed polymeric layer may be used in a manner akin to a stencil. The number of multiple copies formed is necessarily dependent upon exhaustion of the soluble dye capacity, which in turn is dependent upon the quantum of soluble dye and/or solvent utilized, which in turn may be varied over a substantial range to suit the requirements of the practitioner.

In general, the light-sensitive differentially permeable materials which are applicable in the practice of this invention include a wide variety of materials which are of polymeric character. Such differentially permeable materials are well known in the art, and the recognition that such materials are light sensitive comprises no part of the present invention as such. As indicated above, however, it has not heretofore been recognized that such light-sensitive polymeric materials could be employed in transfer processes such as those heretofore described, wherein the color-providing substance is transferred through or to the unexposed, permeable portions of the polymeric layer. In contrast, prior processes have removed the unexposed areas, e.g., by utilizing their differential solubility.

Light-sensitive differentially permeable polymeric materials containing recurring —CH═CH—O— groups have been determined to be especially desirable for utilization in the practice of this invention.

As examples of the typically useful polymeric materials containing recurring —CH═CH—CO— groups, mention may be made of the esterification products of hydroxy-containing polymeric materials such as starch, cellulose, or polyvinyl alcohol reacted with ordinary cinnamic acid or a cinnamic acid halide, such as for example, α-phenyl, β-phenyl, ortho-chloro, or m-nitro cinnamic acid chlorides. The preparation of said esterification products is disclosed in U.S. Patents Nos. 2,566,302 and 2,690,966. Other useful light-sensitive polymeric materials containing recurring —CH═CH—CO— groups are the cinnamoylated polystyrenes, such as those disclosed in the aforementioned U.S. Patent No. 2,566,302; the "alketone" compositions disclosed in U.S. Patents Nos. 1,965,710 and 2,091,715; and the benzal-ar-vinylacetophenone and cinnamal-ar-vinyl-acetophenone polymers disclosed in U.S. Patents Nos. 2,716,102, 2,716,097 and 2,706,725.

It is believed that the preferred light-sensitive polymeric materials owe their differential permeability and light-sensitive properties to the presence in the resin molecule of the aforementioned recurring groups. Upon exposure to actinic radiation, a differential hardening of the polymeric layer is effected apparently as a result of the molecular cross linking of the respective recurring groups. This reaction, a function of the point-to-point degree of exposure, results in a quantitative conversion of the liquid-permeable polymeric material proportional to the incidence of actinic radiation. Accordingly, the distributive transfer of a dye or dyes, or the color-forming components thereof, may be determined and controlled by the selected exposure of the light-sensitive polymeric materials, and thus the polymeric materials of this invention are especially useful for the selective determination of dye diffusion, for example, in diffusion-transfer photographic processes.

Where desired, the light-sensitive differentially permeable polymeric materials may be appropriately sensitized by the addition of suitable additives. Additives of a character suitable for effecting an increase in the relative speed of the light-sensitive polymeric layer's reaction, and/or an amplification of the effect of the incidence of actinic radiation, are well known in the art. Likewise, the sensitizers may be added to effect an increase in the spectral range available to effect the excitation of the light-sensitive polymeric material. In other words, where desired, the sensitivity of the light-sensitive polymeric material may be extended toward the red by the addition thereto of appropriate sensitizers.

Where desired, the light-sensitive materials may be coated upon a variety of supports by employing a wide variety of solvents, preferably solvents having a low boiling point, as the carrier for the light-sensitive material. Flexible supports are particularly desirable where the diffusion-transfer process is carried out in a photographic mechanism, such as for example a camera. Suitable solvents for applying the coating include, by way of illustration, hydrocarbon solvents, esters, chlorinated hydrocarbons, etc., as well as mixtures of such solvents. The selection of the particular solvent to be employed would obviously be a matter of individual choice within the judgment of the skilled worker.

To provide image-forming constituents, a large number of dyes capable of being solubilized and diffusing through a permeable light-sensitive polymeric material are available for the practice of this invention. Among the large number of complete dyes available, mention may be made, by way of illustration, of monoazo, disazo, and anthraquinone dyes. The field of dye materials is further extended by the employment of dye substances of the type which are colorless or of a color other than that ultimately desired in a particular environment, for example an acid environment, but which upon change in the environment, such as a change in pH, take on a color change. Dye substances of this type include indicator dyes, leuco dyes, and carbinols of basic dyes.

The field of color-providing substances may be still further extended by employing color-forming components of a dye or dyes, i.e., dye intermediates, for example the unreacted form of a colored or uncolored color-coupler which, upon coupling at some stage in the process, forms the desired complete dye. Compounds which may couple to form a dye are of course well known in the art. As illustrative of such compounds, mention may be made, for example, of phenolic compounds and aromatic amines, either of which may couple with a diazonium salt to form an azo dye. The addition of the material or compound capable of coupling with the color-forming component may be accomplished by inclusion in the dye diffusion medium, the polymeric stratum and/or in the print-receiving stratum. When it is desired to include in the print-receiving stratum the material capable of coupling with the color-coupler, the material may be added either before or after separation of the stratum from association with the light-sensitive polymeric layer.

The liquid processing composition, comprising an aqueous and/or organic liquid employed in carrying out this invention, possesses at least a liquid of sufficient solvent activity to act as a dye-carrier for the diffusion of the dye or color-forming component of the dye to a print-receiving element. The pH of the dye carrier preferably corresponds with either a predetermined pH or the optimum pH range providing maximum solubility and/or desired color characteristics of the dye or dyes. Since the rate of color image formation in the print-receiving layer is in part determined by the rate that the dye carrier permeates the unexposed area of the polymeric layer and the print-receiving layer, the rate of image formation may be controlled at least in part by the selection of a solvent which exhibits the desired rate of permeation. It will be apparent that the solvent, pH, etc., are also selected so as to have minimum effect on the exposed areas of the light-sensitive polymeric layer.

It is also within the scope of this invention to employ a mixture of more than one dye solvent where found desirable or expedient to do so.

In addition to the use of rupturable containers such as those described previously, application of a suitable dye solvent or dye solution to the light-sensitive polymeric element may also be accomplished, for example, by immersing, coating, spraying, flowing, etc., and the light-sensitive polymeric element superposed on a sheet-like image-receiving element prior to, during or subsequent to application.

A viscosity-increasing compound which, when spread over a water-absorbent base, will form a relatively firm, dimensionally stable film, is preferably included in the liquid processing composition to assist in carrying out the uniform spreading of the composition between layers of the film unit. A suitable film-forming material is a high molecular weight polymer such as, for example, a polymeric, water-soluble ether such as hydroxyethyl cellulose or sodium carboxymethyl cellulose. Film-forming compositions of this nature are described in U.S. Patent No. 2,559,643. It is also contemplated that, where found expedient to do so, auxiliary hardening agents which do not adversely affect the dye or dyes may be added to the dye solvent in order to effect an increase in the hardness in the exposed areas of the polymeric material and thereby consequently effecting a decrease in the permeability of the exposed areas of the polymeric material. Hardening agents of this character which can be utilized for these purposes are well known in the art.

As previously mentioned, it may be desirable in some instances to incorporate in the print-receiving element a material capable of coupling with the color-coupler in order to effect the coupling of dye intermediates within the dye solvent and/or the print-receiving layer. The inclusion in the print-receiving element of a material capable of coupling with a color coupler is disclosed in U.S. Patent No. 2,559,643. The dye control mechanism of this invention may also be employed to control the diffusion of color-forming components. The mechanism may also be employed to control the transfer of oxidized color developer which will couple with a color-coupler which may be initially present on the receiving layer. It may also be used to control the transfer of color-forming components which will effect a color change in pre-dyed image-receiving layers. As illustrative of the latter process, mention may be made of transferring a reducing agent in a color system wherein oxidized monomeric or polymeric indophenol dye or dyes are disposed in or on a suitable image-receiving element. In such systems, a selective reduction of said oxidized indophenol dye or dyes may be effected to provide loss of color in or on said image-receiving sheet in terms of the unexposed areas of a selectively exposed light-sensitive differentially permeable polymeric element. If desired, the reduced dye may be removed by solution in an appropriate solvent, leaving a negative image.

As previously noted, the sensitivity of the light-sensitive differentially permeable materials of this invention may be appropriately restricted, areawise, to specific wave lengths of the spectrum, such as, for example, by selectively coating, areawise, the surface of differentially permeable materials with appropriate filter agents. Thus, the light-sensitive materials may provide a desirable matrix for use in the preparation of appropriately colored color screen elements according to procedures well known in the art and may therefore be utilized to obtain multicolor images.

To build up a greater density of image dye in the positive element, it may be found expedient to have an efficient dye-precipitating mechanism included in the image-receiving materials. Consequently, it may be desirable to have a mordant included in the image-receiving sheet, as well as utilizing a print-receiving element having a layer or stratum which has an inherent affinity for the dye.

The use of a mordant in the print-receiving element is disclosed in U.S. Patent No. 2,559,643. Other dye-precipitating mechanisms would readily suggest themselves to the skilled worker.

If the color of the dye is affected by changes in the pH or the image-receiving element, this pH may be adjusted in accordance with well known techniques in order to provide a pH affording the desired color.

The following examples show by way of illustration, and not by way of limitation, the use of light-sensitive permeable polymeric materials in accordance with the present invention.

*Example 1*

A layer of a light-sensitive polyvinyl cinnamate resin, commercially available under the trade name "Kodak Photo Resist," was applied over a gelatin layer containing, as the soluble dye, Acid Red 1 (C.I. 31) applied from a gelatin solution containing 2% of the dye and a small amount of "Antarox D–100" (trade name of Antara Chemicals Division, General Dyestuff Corporation, New York, N.Y., for an aliphatic polyglycol ether, a nonionic emulsifier and disperser). This negative was then exposed to an ultraviolet lamp, placed in superposed relation to a receiving sheet comprising cellulose acetate-coated baryta paper which had been coated with an aqueous solution comprising 3% polyvinyl alcohol and 1% polyvinyl pyrrolidone to provide an image-receiving layer, and imbibed with an aqueous alkaline 3% sodium carboxymethyl cellulose processing composition. An imagewise transfer of the dye from behind the unexposed areas was obtained, giving an orange positive dye image. The orange color was due to the pH sensitivity of the dye.

This example demonstrates the differential permeability of the exposed polymeric material to the alkaline processing composition by the fact that the negative became orange in the unexposed areas due to the pH change but remained red in the exposed areas since the alkaline processing solution did not permeate the exposed areas to contact the dye. It will be apparent that the negative element thus contains a useful image in addition to the transfer image.

*Example 2*

The procedure of Example 1 was repeated, employing, as the processing solution, an aqueous solution comprising 3% sodium carboxymethyl cellulose and 20% acetone. An imagewise transfer of the dye from behind the unexposed areas imparted a red positive dye image to the print-receiving sheet. It will be noted that no change occurred in the color of the dye since the alkali was omitted from the processing solution.

*Example 3*

A subcoated cellulose acetate sheet was coated with a 4% gel solution containing 4% Acid Blue 34 as the soluble dye. The coating was applied at a speed of 10 feet per minute and then dried. Over this coating there was then applied, at a speed of 5 feet per minute, a second coating consisting of equal parts of "Kodak Photo Resist" and tetrahydrofuran. This sheet was then exposed for five minutes through a positive color transparency by light from a sunlamp. It was then imbibed for 30 seconds with a processing composition containing 6 parts by volume of tetrahydrofuran to 10 parts by volume of 2% aqueous hydroxyethyl cellulose. An imagewise transfer of the dye from behind the unexposed areas was obtained to give a positive dye image on the receiving sheet placed over the processing composition during imbibition.

In the preceding portions of the specification, the expression "color" has been frequently used. This expression is intended to include the use of a plurality of colors to obtain black, as well as the use of a single black dye.

It will be understood that multicolor transfer images may be obtained in accordance with the novel precesses described herein, by forming three separate monochrome images by sequential transfer from separate, differentially exposed light-sensitive polymeric layers to a common image-receiving layer. Alternatively, a multicolor transfer image may be obtained by effecting the just-described monochromatic transfers to separate image-receiving layers, at least two of which are transparent, and superposing the resulting monochromes in registered relationship. Suitable film structures for use in these embodiments are disclosed in U.S. Patent No. 2,647,049, issued to Edwin H. Land on July 28, 1953.

Since certain changes may be made in the above products and processes without departing from the scope of the invention herein involved, it is intended that all matter contained in the above description or shown in the accompanying drawing shall be interpreted as illustrative and not in a limiting sense.

What is claimed is:

1. The process of forming images in color which comprises exposing a light-sensitive element comprising a light-sensitive permeable polymeric material selected from the group consisting of cinnamic acid esters of polyvinyl alcohol and cellulose, benzal-ar-vinylacetopenone polymers, cinnamal-ar-vinylacetophenone polymers, cinnamoylated polystyrenes and cinnamal ketones, and at least one color image-forming material, thereby selectively reducing the permeability of said polymeric material in areas of exposure; contacting said exposed element with an aqueous processing medium comprising at least a solvent for said color image-forming material; permeating exposed and partially exposed areas of said polymeric material with said composition to form an imagewise aqueous solution containing said color image-forming material in terms of unexposed and partially exposed areas of said polymeric material; and diffusing at least a portion of said imagewise solution through said unexposed and partially exposed polymeric material to a superposed image-receiving layer to form a positive image on said image-receiving layer consisting essentially of said color image-forming material.

2. The process as defined in claim 1 wherein substantially all of said color image-forming material in said imagewise solution is diffused through said unexposed and partially exposed polymeric material, thereby forming a negative image on said light-sensitive element.

3. The process of forming images in color which comprises exposing a light-sensitive element comprising a light-sensitive permeable polymeric material selected from the group consisting of cinnamic acid esters of polyvinyl alcohol and cellulose, benzal-ar-vinylacetophenone polymers, cinnamal-ar-vinylacetophenone polymers, cinnamoylated polystyrenes and cinnamal ketones, thereby selectively reducing the permeability of said polymeric material in areas of exposure; contacting said exposed element with an aqueous solution of color image-forming constituents; and diffusing said solution substantially only into unexposed and partially exposed areas of said polymeric material thereby forming a positive color image on said element.

4. The process of forming images in color which comprises exposing a light-sensitive element comprising a light-sensitive permeable polymeric material selected from the group consisting of cinnamic acid esters of polyvinyl alcohol and cellulose, benzal-ar-vinylacetophenone polymers, cinnamal-ar-vinylacetophenone polymers, cinnamoylated polystyrenes and cinnamal ketones, thereby selectively reducing the permeability of said polymeric material in areas of exposure; providing a substantially uniform distribution of soluble color image-forming constituents in a layer on a second element; superposing said layer on said exposed light-sensitive element; absorbing an aqueous medium comprising a solvent for said image-forming constituents into said layer, thereby forming an aqueous solution containing said image-forming constituents; and diffusing said color image-forming constituents substantially only into unexposed and partially exposed areas of said polymeric material thereby forming a positive color image on said element.

5. The process of forming images in color which comprises exposing a light-sensitive element comprising a light-sensitive permeable polymeric material selected from the group consisting of cinnamic acid esters of polyvinyl alcohol and cellulose, benzal-ar-vinylacetophenone polymers, cinnamal-ar-vinylacetophenone polymers, cinnamoylated polystyrenes and cinnamal ketones, and at least one color image-forming material, thereby selectively reducing the permeability of said polymeric material in areas of exposure; contacting said exposed element with a processing composition comprising at least a solvent for said color image-forming material, said polymeric material being non-diffusible in said processing composition; permeating unexposed and partially exposed areas of said polymeric material with said processing composition to form an imagewise solution of said color image-forming material in terms of unexposed and partially exposed areas of said polymeric material; and diffusing at least a portion of said solution through said unexposed and partially exposed polymeric material to a superposed image-receiving layer to form a positive image on said image-receiving layer comprising essentially said color image-forming material.

6. The process of forming images in color which comprises providing a light-sensitive element comprising a light-sensitive permeable polymeric material selected from the group consisting of cinnamic acid esters of polyvinyl alcohol and cellulose, benzal-ar-vinylacepthenone polymers, cinnamal-ar-vinylacetophenone polymers, cinnamoylated polystyrenes and cinnamal ketones, and a dye, the color of said dye being changeable in an alkaline environment; exposing said light-sensitive element, thereby selectively reducing the permeability of said light-sensitive polymeric material in the areas of exposure; and forming a two-color image by contacting said exposed light-sensitive element with an aqueous alkaline solution, said solution permeating said polymeric material substantially only in unexposed areas, thereby causing a color change in the dye only in said unexposed areas.

7. The process as defined in claim 6 wherein said dye is soluble in said aqueous alkaline solution and at least a portion of the dye solution formed by permeating said exposed polymeric material with said aqueous alkaline solution is transferred by imbibition to a superposed print-receiving element to form thereon a positive dye image.

References Cited by the Examiner

UNITED STATES PATENTS

| | | | |
|---|---|---|---|
| Re. 9,000 | 12/1879 | Edwards | 101—149.4 |
| 1,408,315 | 2/1922 | Thornton | 101—141.1 X |
| 2,690,966 | 1/1951 | Minsk et al. | 96—36 X |
| 2,653,527 | 9/1953 | Land | 96—29 |
| 2,670,286 | 2/1954 | Minsk et al. | 96—35 |
| 2,756,143 | 7/1956 | Murray | 96—28 |
| 2,969,731 | 1/1961 | Kendall | 96—35 X |
| 3,019,104 | 1/1962 | Oster | 96—29 |
| 3,019,106 | 1/1962 | Adams | 96—33 X |
| 3,030,207 | 4/1962 | Land | 96—29 |
| 3,060,025 | 10/1962 | Burg et al. | 96—28 |
| 3,097,096 | 7/1963 | Oster | 96—30 |
| 3,100,702 | 8/1963 | Rauner et al. | 96—28 |

FOREIGN PATENTS

| | | |
|---|---|---|
| 609,057 | 11/1960 | Canada. |
| 1,064,808 | 9/1959 | Germany. |
| 713,947 | 8/1954 | Great Britain. |
| 804,971 | 11/1958 | Great Britain. |

OTHER REFERENCES

Mees, The Theory of the Photographic Process, Macmillan, N.Y. (1954), p. 74.

ALEXANDER D. RICCI, *Primary Examiner.*

HAROLD N. BURSTEIN, NORMAN G. TORCHIN,
*Examiners.*

B. E. EDELSTEIN, G. H. BJORGE, J. T. BROWN,
*Assistant Examiners.*